United States Patent [19]

Ross et al.

[11] 4,145,524
[45] Mar. 20, 1979

[54] PREPARATION OF HETEROCYCLIC BLOCK COPOLYMER FROM PERFLUOROALKYLENE OXIDE α, ω-DIAMIDOXIMES

[76] Inventors: Robert A. Frosch, Administrator of the National Aeronautics and Space Administration, with respect to an invention of, Leonard O. Ross, Sunnyvale; Robert W. Rosser, San Jose, both of Calif.

[21] Appl. No.: 843,090

[22] Filed: Oct. 17, 1977

[51] Int. Cl.² ............................................. C08G 73/06
[52] U.S. Cl. ............................... 528/401; 260/307 G; 528/422
[58] Field of Search ................ 260/78.41, 2 R, 307 G; 528/401, 422

[56] References Cited

U.S. PATENT DOCUMENTS

| | | | |
|---|---|---|---|
| 3,275,608 | 9/1966 | Montgomery et al. | 260/78.4 |
| 3,484,389 | 12/1969 | Iwakura et al. | 260/2 |
| 3,960,814 | 6/1976 | Cochoy | 260/47 R |

Primary Examiner—Earl A. Nielsen
Attorney, Agent, or Firm—Armand McMillan; John R. Manning; Darrell G. Brekke

[57] ABSTRACT

Diamidoxime monomers having the formula:

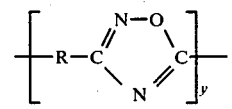

are intermolecularly and thermally condensed to form a heat and chemical resistant polymer containing 1,2,4-oxadiazole linkages and having the formula:

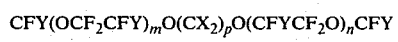

wherein R represents identical bivalent organic radicals or any combination of bivalent organic radicals selected from the group consisting of $-(CX_2)_p-$, wherein p ranges from 2 to 8 when X is fluorine and 2 to 18 when X is hydrogen, chlorine, nitro or aryl; arylene; and an oligometric or polymeric radical prepared by reacting a dicarboxylic acid halide with a fluorinated epoxide and having the formula:

$$CFY(OCF_2CFY)_mO(CX_2)_pO(CFYCF_2O)_nCFY$$

wherein Y is fluorine or trifluoromethyl, X is nitro, aryl, hydrogen, chlorine or fluorine, preferably the latter, p ranges from 1 to 18 and m+n ranges from 2 to 7.

7 Claims, No Drawings

PREPARATION OF HETEROCYCLIC BLOCK COPOLYMER FROM PERFLUOROALKYLENE OXIDE α, ω-DIAMIDOXIMES

ORIGIN OF THE INVENTION

The invention described herein was made in the performance of work under a NASA contract and subject to the provisions of Section 305 of the National Aeronautics and Space Act of 1958, Public Law 85-568 (72.stat. 435; 42 U.S.C. 2457).

BACKGROUND OF THE INVENTION

1. Field of the Invention

The present invention relates to polymers that are derived from diamidoxime monomers and contain heterocyclic rings that serve as linking groups in the polymeric chain. More particularly, the present invention relates to polymers derived from the diamidoxime product of the reaction between an α, ω-dinitrile with hydroxylamine.

2. Description of the Prior Art

Amidoximes are a known class of compounds which are generally prepared by the reaction of a nitrile compound with hydroxylamine or a salt thereof. Another method of preparing amidoximes involves the reaction of an amine compound with a hydroxamoyl halide. Thus, in U.S. Pat. No. 2,897,185, there is disclosed the preparation of a class of compounds, effective in the treatment of hypertension, by the reaction of cyclic organic compounds containing a nitrile functional group with hydroxlamine.

Several types of amidoxime polymeric materials have been prepared in the past for use in the modification of various fibrous substrates. British Pat. Nos. 786,960 and 863,533 describe the preparation of polymers containing many pendant amidoxime groups, by reacting a polymeric material containing a multitude of nitrile groups such as polyacrylonitrile or polyvinylidenecyanide with hydroxylamine. The resulting amidoxime polymers are useful in the textile field for the treatment of known fibers to improve their dyeability. The polymers can also serve as dispersing and/or binding agents in light sensitive emulsions, and in the fabrication of smoke filters for cigarettes. These amidoxime polymers, when added to colloidal solutions, improve the rheological properties of the solutions.

Also known are polymers containing 1,2,4-oxadiazole linkages, which may be prepared by the cyclization of poly(0-acylamidoximes), the latter polymeric intermediate having in turn been obtained from the reactions of aliphatic or aromatic diamidoximes and dicarboxylic acids or their derivatives. This and other methods of synthesizing these polymers have been reviewed, for instance, in the article of Polyhydrazides and Polyoxadiazoles, Encyclopedia of Polymer Science and Technology, Volume 11 (1969), pages 184–7.

SUMMARY OF THE INVENTION

An object of this invention, therefore, is to prepare new fluorinated diamidoxime compounds as well as new polymers derived from said compounds.

Another object is to provide a simplified method by which these polymerizations can be carried out.

Still another object is to provide a method which may be also employed to prepare known 1,2,4-oxadiazole polymers from the corresponding non-fluorinated diamidoximes, without resort to the dicarboxylic acids and derivatives required by the art.

Briefly, these and other objects of the present invention which shall hereinafter become readily apparent, can be attained by a process of preparing polymers containing 1,2,4-oxadiazole linkages of the formula:

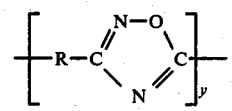

wherein R represents fluorinated identical bivalent organic radicals or any combination of bivalent organic radicals selected from the group consisting of —(CX$_2$)$_p$—, wherein p ranges from 2 to 8 when X is fluorine and 2 to 18 when X is hydrogen, chlorine, nitro or aryl; arylene; and an oligomeric or polymeric radical prepared by reacting a dicarboxylic acid halide with a perfluoro epoxide and having the formula:

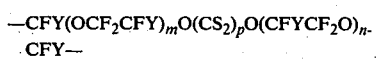

wherein Y is fluorine or trifluoromethyl, X is fluorine, chlorine, hydrogen, nitro or an aryl group, p ranges from 1 to 18 and m+n ranges from 2 to 7 by heating a diamidoxime compound of the formula:

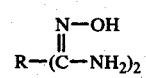

at a rate sufficient to effect the gradual release of water, ammonia and other gaseous products thereby forming the polyoxadiazole containing heterocyclic linkage groups of the 1,2,4-oxadiazole type.

DETAILED DESCRIPTION OF THE INVENTION

The process of the present invention is one of polymerization of compounds containing at least two amidoxime groups each. It takes place through the intermolecular interaction of the amidoxime groups in a manner such that 1,2,4-oxadiazole rings are formed as linkages between the resulting monomeric units.

The diamidoxime compounds which can be polymerized by the process of the present invention have the formula:

wherein R is as defined above.

These diamidoxime compounds can be prepared by reacting the corresponding dinitrile compounds with hydroxylamine under anhydrous conditions in quantities sufficient to convert all nitrile groups to amidoxime groups. This reaction is normally conducted at ambient temperatures and can be shown as follows:

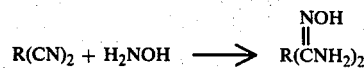

In a preferred embodiment of the reaction, since the hydroxylamine is usually stabilized in the form of the hydrochloride salt, hydroxylamine is liberated from its salt form by treatment of the salt with a base such as sodium butoxide under anhydrous conditions, usually in an alcoholic or other inert solvent.

The polyether dinitriles that are converted by the process just described to the preferred diamidoximes for use in the polymerization process of the invention, may be prepared by the cesium fluoride catalyzed reaction of e.g. a preferably perfluorinated aliphatic diacid fluoride with a perfluoroepoxide such as hexafluoropropoxide. The size of the resulting molecule can be built up stepwise by the introduction of larger quantities of the epoxide, to yield compounds of the general formula:

F(O)C·CFY(OCF$_2$CFY)$_m$O(CX$_2$)$_p$O(CFYCF$_2$O)$_m$-CEYC(O)F in which Y stands for a fluorine atom or a trifluoromethyl group; X is a nitro or aryl group or an hydrogen, chlorine or fluorine atom, preferably the latter; p ranges from 1 to 18, preferably 1 to 8; and m+n ranges from 2 to 7.

The polyether diacid fluorides thus obtained are then converted to the diamides by treatment with liquid ammonia, and in turn to the dinitriles by means of phosphorus pentoxide. Both these reactions are well known reactions.

The diamidoxime compounds just described, as well as other conventional non-fluorinated aliphatic and aromatic diamidoximes are then polymerized, individually or as mixtures, by an intermolecular condensation process during which ammonia and water are ultimately eliminated and heterocyclic linkages are formed which have a 1,2,4-oxadiazole structure. The overall reaction can be illustrated as follows:

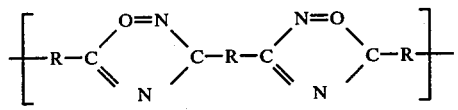

Conceivably, some head-to-head linkages are also formed, although this can not readily be determined:

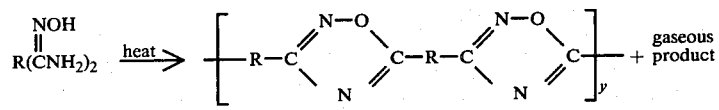

The condensation reaction readily takes place at temperatures within the range of about 100° to 250° C. and is preferably conducted between 130° and 200° C. in vacuo or in an inert atmosphere such as a flow of nitrogen. With certain diamidoxime monomers, it may be advantageous to employ cyclization catalysts of the transition metal compound type.

The polymers thus obtained typically have a molecular weight range of about 3000 to 20,000, as determined by liquid chromatography and vapor pressure osmometry. The value of subscript y in the structural polymer formula above is commensurate with the molecular weight range described for the polymers. However, polymers or copolymers of up to 50,000 or more have been prepared by this process. Evidence of their 1,2,4-oxadiazole linkages has been obtained from a study of model compounds containing this ring system, and confirmed by observation of an infrared peak at 6.29 μm and by U.V. spectrum data.

The heat and chemical resistant polymeric materials of the present invention can be compounded with a great variety of conventional fillers, extenders and modifiers for use in numerous applications in which high stability, impermeability to liquids and gases, and good plasticity are advantageous. In this manner, they can be employed, for example, as adhesives, caulking compounds, channel sealants, and fuel tank liners.

The invention having thus generally been described, a few specific embodiments will now be provided to further illustrate the new process and products disclosed. These examples are not intended to be limiting, unless otherwise specified.

EXAMPLE 1

Preparation of a Perfluoroalkylene Oxide-α, ω-diamidoxime of the formula:

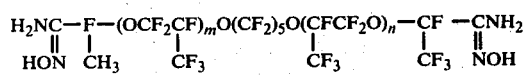

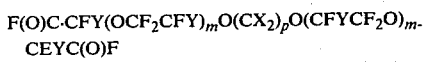

wherein
m+n=4,5, and 6

(m+n=4=5%; m+n=5=82%; m+n=6=13%)

A 0.23 g (0.01 mol) amount of sodium was reacted with 20 ml of methanol. The solution was cooled and 0.70 g (0.011 mol) of hydroxylamine hydrochloride was added. The mixture was stirred for 1 hour as sodium chloride precipitated. The sodium chloride was filtered and to the resulting filtrate was added 5 g (0.004 mol) of perfluoroalkylene oxide-α, ω-dinitrile (m+n=4,5, and 6). The mixture was stirred overnight and the solvent evaporated. The mixture was dissolved in trichlorotrifluoroethane (Freon 113) filtered and concentrated to dryness. 5.0 grams (99%) of perfluoroalkylene oxide-α, ω-diamidoxime was obtained.

Analytical data: Ir (film) 2.85 (OH), 5.85, 5.90, 6.26 (C=N), 7-9 (CF).

EXAMPLE 2

Preparation of Perfluoroalkylene Oxide-α, ω-diamidoxime as in Example 1, but wherein m+n=5,6, and 7;

(m+n=5=2.7%; m+n=6=94.7%; m+n=7=2.0%)

A 0.23 g (0.01 mol) amount of sodium was reacted with 20 ml of methanol. The solution was cooled and 0.70 g (0.011 mol) of hydroxylamine hydrochloride was added. The mixture was stirred for 1 hour as sodium chloride precipitated. The sodium chloride was filtered and to the solution was added 5 g (0.004 mol) of perfluoroalkylene oxide-α, ω-dinitrile (m+n=4,5, and 6) in 20 ml of Freon 113. The reaction was stirred overnight and the solvent was removed in vacuo, leaving 5 g (99%) of a gummy residue. The product was dissolved in Freon 113, filtered and concentrated to dryness leaving 4.8 g (96%) of the perfluoroalkylene oxide-α, ω-diamidoxime.

Analytical data: IR (film): 2.85 (OH), 5.85, 5.90, 6.26 (C=N), 7-9 (CF).

EXAMPLE 3

Preparation of Perfluoroalkylene Oxide-α, ω-diamidoximes Dimer, Where $m+n=5,6$, and 7

$(m+n=5=2.7\%; m+n=6=94.7\%; m+n=7=2\%)$

A 2.0 g (0.0006 mol) quantity of the dimer of the perfluoroalkylene oxide-α, ω-dinitrile of Example 1 (mw ~ 3000) in 20 ml of Freon 113 was stirred with 0.1 g (0.03 mol) of hydroxylamine over a period of 24 hours. The solution was filtered and the solvent removed in vacuo 2.0 g (99%) of the perfluoroalkylene oxide-α, ω-diamidoxime was obtained.

Analytical data: IR (film): 2.85 (OH), 6.26 (C=N), 7-9 (CF).

EXAMPLE 4

Polymerization of Perfluoroalkylene Oxide-α, ω-diamidoximes $(m+n=4,5$, and 6)

The diamidoxime of Example 1 was condensed in an all-glass apparatus, and the gaseous products were trapped at $-196°$ C.

A 1.61 g quantity of the amidoxime (0.0013 mol) was placed in a 10-ml round bottom flask containing a small magnetic stirring bar and connected to a vacuum line. The sample was degassed with stirring at 60° and 0.01 μ for 1 hour. The trap was then cooled to $-196°$ C., and 10 mm nitrogen pressure was introduced into the system. The system was evacuated and the contents of the trap were allowed to expand into a 1-liter bulb. The total system volume was estimated to be 1200 ml; pressure 4.5 mm. $2.96 \times 10^{-4}$ moles of gaseous product were measured. Further reaction for 40 hours at 225° increased the amount of gaseous product to $5.12 \times 10^{-4}$ moles. The polymeric material remained in the flask for a yield of 1.5 g (97% yield).

Analytical data: IR τmax (μ): 6.28 (C=N), 5.92 (unreacted amidoxime), 7-9 (CF). Physical property data: glass transition temperature $(T_g) = 43°$ C. Thermogravimetric analysis (Tga): $I_{1\%} = 380°$ C., $T_{50\%} = 520°$ C., $T_{95\%} = 525°$ C., $T_\% =$ temperature at weight loss.

EXAMPLE 5

Polymerization of Perfluoroalkylene Oxide-α, ω-diamidoximes $(m+n=5,6,7)$

A 6.08 g (0.004 mol) quantity of the perfluoroalkylene oxide-α, ω-diamidoxime of Example 2 $(m+n=5,6$, and 7) was heated at 200° C. in vacuo (2 mm) with stirring for 110 hours. During this time, a very viscous amber colored material developed. The flask was cooled and 5.73 g (~89%) of polymer was obtained.

Analytical data: Ir (film): C=N (6.28), 7-9 (CF). Thermogravimetric analysis (Tga): $T_{1\%} = 300°$ C., $T_{50\%} = 490°$ C., $T_{100\%} = 500°$ C. Glass transition temperature $(T_g) = -43°$ C.

EXAMPLE 6

Polymerization of Perfluoroalkylene Oxide-α, ω-diamidoxime dimer, where $m+n=5,6$, and 7

A 1.0 g (0.0003 mol) quantity of the perfluoroalkylene oxide-α, ω-diamidoxime dimer of Example 3 was placed in a small vessel and heated at 180° C. in vacuo (0.2 mm) for 72 hours. During this time 0.9 g (97%) of an amber viscous polymer developed.

Analytical data: IR (film): 6.25 (C=N), 7-9 (CF). Physical property data: glass transition temperature $(T_g) = -43°$ C. Thermogravimetric analysis (Tga): $T_{1\%} = 380°$ C., $T_{50\%} = 480°$ C., $T_{100\%} = 500°$ C.

EXAMPLE 7

Polymerization of a perfluoropolyalkylether diamidoxime with its corresponding diacid fluoride - prior art method. To 0.39 g (0.3 mmol) of the diamidoxime of Example 1 $(m+n=4)$ dissolved in 10 ml Freon 113 and 1 ml triethylamine, was added 0.38 g (0.3 mmol) of the corresponding diacid fluoride $(m+n=4)$. The mixture was stirred for 6 hours, filtered to remove triethylamine hydrofluoride, and evaporated under reduced pressure (18 mm Hg) to dryness. 0.45g (94%) of the material remained as a brown oil. These results indicate the difficulty of obtaining high molecular weight polyperfluoro-1,2,4-oxidiazole from a 1:1 ratio of acid fluoride to amidoxime.

EXAMPLE 8

A stepwise process was employed using the materials and conditions of Example 7, the change being that the acid fluoride was added slowly at ambient temperature to the amidoxime in Freon 113 containing the triethylamine. A viscous oil was obtained having a molecular weight of ~3000, as determined by vapor phase osmometry. Attempts were made to further extend the chain of this low polymer, e.g., by treating its solution as previously done with one equivalent of the acid fluoride. The product obtained was less viscous than the starting material and did not exhibit any of the properties of a high molecular weight compound.

EXAMPLE 9

The reaction of Example 7 was carried out again with the same materials, but in refluxing pyridine. Only unidentifiable dark oils of low molecular weight were produced, which showed a trace of C=N formation, as evidenced by weak IR bands in the 5.9-6.3 μ region. The results point to a mixture of products with a molecular weight of a dimer at best.

EXAMPLE 10

To 6.2415 g (4.5 mmol) of a polyether dinitrile such as used in Example 1 $(m+n=6$; mw ~ 1500) in Freon 113 (~ 25 ml) was added 0.35 g NH$_2$OH (10.6 mmol). This solution was stirred for 72 hours in a nitrogen atmosphere while being chilled in an ice bath. The solvent was evaporated under vacuum and the sample degassed overnight. The diamidoxime thus obtained was then heated in vacuo at 200° C. and 30 in. Hg for 72 hours to give 6.16 g of an amber, tacky, viscous polymer. The infrared spectrum showed the formation of a peak at 6.29 μ (1,2,4-oxadiazole). The glass transition temperature of the product measured $-47°$ C. A thermogravimetric analysis of the polymer was carried out in air and in nitrogen at a heating rate of 10° C. per minute to yield the following data:

| Weight Loss | Air | N₂ |
|---|---|---|
| 1% | 378° C | 385° C |
| 50% | 472 | 491 |
| 95% | 483 | 509 |

It is evident from this data that the product obtained by the procedure of Example 7 is quite resistant to heat and to oxygen in ambient concentrations.

EXAMPLE 11

Preparation of the linear polymer of perfluorosebacyl diamidoxime.

To 3.01 perfluorosebacyl dinitrile (6.6 mmol) in 20 ml Freon 113, was added 0.6 $NH_2OH$ (18.2 mmol). This solution was stirred overnight in a nitrogen atmosphere while being chilled in an ice bath. The reaction was very exothermic and a white precipitate formed. The solvent was removed by filtration and the product dried overnight at 100° C. By this procedure 2.14 g of perfluorosebacyl diamidoxime (71% yield) was obtained which had a melting point — sublimation point — of 183° C.

Analytical data: IR (KBr pellet); 2.96 μ (NH), 3.1 μ (OH), 5.80 and 6.32 μ (C≡N).

A 0.6 g quantity of the perfluorosebacyl diamidoxime (1.3 mmol) was then placed in a 200-ml sealed flask and heated in vacuo at 200° C. and 15 in. Hg for 2.5 hours to give 0.32 g of an amber brittle solid. The amorphous polymer had a Tg (glass transition temperature) of 117°–118° C. The IR indicated reduction of the amidoxime peaks with the formation of the 1,2,4-oxadiazole peak at 6.29 μ.

EXAMPLE 12

Preparation of a diamide [R(COHN₂)₂] in which the R group is that of the polyether radical of the diamidoxime of Example 1 ($m+n=3$).

The diacid fluoride (15.85 g, 18.0 mmol), corresponding to the diamide desired, was diluted to 40 ml with Freon 113, and added over 5 minutes to 100 ml Freon 113 saturated with $NH_3$. Excess $NH_3$ was then bubbled into the solution, with stirring, for 30 minutes at room temperature. The solution was filtered hot and the solvent evaporated under vacuum to yield 14.44 of the diamide (91%).

EXAMPLE 13

Preparation of the dinitrile from the diamide of Example 12.

To 14.44 g of the diamide of Example 12 (16.4 mmol) was added 7.7 g of $P_2O_5$ (54 mol) and the mixture was heated to 160° C. for 6 days. The product was then vacuum distilled at 132° C. under 2 mm Hg pressure to give 11.12 g (77%) of the corresponding nitrile.

EXAMPLE 14

A 0.45 g quantity of the dinitrile of Example 13 (0.51 mmol) was reacted with >0.07 g $NH_2OH$ to prepare the corresponding diamidoxime derivative. The procedure of Example 7 was used to polymerize the resulting amidoxime at 200° C. in vacuo for 72 hours and 0.41 g of an amber, tacky, viscous polymer with a Tg of −43° C. was obtained. The infrared spectrum showed the characteristic 1,2,4-oxadiazole peak at 6.29 μ.

EXAMPLE 15

Preparation of a copolymer of perfluorosebacyl diamidoxime and the polyether diamidoxime of Example 10.

To a mixture of 0.3 g of the diamidoxime of Example 10 (0.22 mmol) and 0.1 g of perfluorosebacyl diamidoxime (0.2 mmol) was added 10 ml of Freon 113. The mixture was stirred for 10 minutes. The solvent was evaporated under vacuum and the mixture placed in a sealed 100-ml flask. The mixture was heated in vacuo at 220° C. and 17 in. Hg for 100 hours to produce a dark, viscous polymer, which gave a $T_g$ of −39° C. The infrared spectrum of the product indicated formation of the 1,2,4-oxadiazole (6.29 μ) links of the polymer.

EXAMPLE 16

Preparation of Terephthalamidoxime

A solution of 7 g hydroxylamine hydrochloride (0.10 mol) was dissolved in 15 ml of ethanol and cooled to 0°–5° C. To the mixture was added 2.3 g sodium (0.10 mol) dissolved in 30 ml ethanol. After generating the free hydroxylamine, 3.05 g of terephthalonitrile (23.8 mmol) suspended in 40 ml of ethanol was added dropwise to the ethanol solution. The mixture was then refluxed for 20 hours. The volume of solution was reduced to 5 ml, and upon cooling a precipitate formed which was filtered. The yield was 2.21 g (48%), m.p. 224–225° C (decomp.). The infrared spectrum (KBr pellet) showed formation of peaks at 2.91 μ and 2.98 μ (NH₂), 306 μ (OH), and 6.07 and 6.26 μ (C≡N).

EXAMPLE 17

Polymerization of Terephthalamidoxime

A small quantity of (~0.1 g) of the terephthalamidoxime of Example 13 was placed in a 20-ml beaker and covered with a watch glass. Heating the amidoxime to its melting point for 30 minutes gave a charcoal-gray solid. The infrared spectrum indicated a reduction of the amidoxime peaks at 5–6.0 μ and the formation of a peak at 6.3 μ which is attributed to the 1,2,4-oxadiazole ring system.

EXAMPLE 18

Preparation of Sebacyl Diamidoxime

A solution of 14.39 g hydroxylamine hydrochloride (0.21 mol) was dissolved in 25 ml water and cooled to 0–5° C. To this solution was added dropwise 8.29 g sodium hydroxide (0.21 mol) dissolved in 20 ml water, followed by addition of 8.51 g sebaconitrile (51.8 mmol) in 50 ml ethanol. The solution was heated to 70 C., with stirring for 40 hours.

The solvent was reduced to ~30 ml and the precipitate filtered. Recrystallization from ethanol gave white crystals, melting at 182-4° C. The yield was 4.44 g (37%). The infrared spectrum (KBr) showed the formation of peaks at 2.95 μ(—NH₂), 3.1 μ(OH), and 6.03 and 6.23 (C≡N).

EXAMPLE 19

Polymerization of Sebacyl Diamidoxime

A small quantity (~0.1 g) of the diamidoxime of Example 15 was placed between two NaCl salt plates and heated at 200° C. for 30 min. whereby an amber, viscous polymer was formed. The infrared spectrum indicated a reduction in the amidoxime peaks and the formation of a peak at 6.32 μ which is characteristic of the 1,2,4-oxadiazole ring.

EXAMPLE 20

Preparation of Adipyl Diamidoxime

A solution of 12.85 g hydroxylamine hydrochloride (0.18 mol) was dissolved in 20 ml water and cooled to 0-5C. To this solution was added dropwise 7.51 g sodium hydroxide (0.19 mol) dissolved in 20 ml water, followed by addition of 8.01 g adiponitrile (74.1 mmol) in 50 ml ethanol. The solution was heated to 65 C, with stirring, for 16 hours.

The solution was filtered while hot and the solvent reduced to ~30 ml. Upon cooling a precipitate formed which was filtered. Recrystallation from water gave white crystals melting at 186-8° C. The yield was 4.41 g (34%). The infrared spectrum (KBr) showed the formation of peaks at 2.95μ and 2.99 μ (—NH$_2$), μ 3.23 μ(—OH), and 6.06 μ and 6.37 μ (C=N).

EXAMPLE 21

Polymerization of Adipyl Diamidoxime

A small quantity (~0.1 g) of the amidoxime of Example 17 was placed between two NaCl salt plates and heated at 200° C. for 30 min. An amber, viscous polymer was obtained which darkened in color upon further heating. The infrared spectrum indicated a reduction of the amidoxime peaks and the formation of a peak at 6.32 μ which is characteristic of a 1,2,4-oxadiazole ring system.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a heat and chemical resistant polymer having the formula:

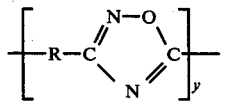

wherein y is an integer of at least 2 and is commensurate with a molecular weight range of about 3000 to about 50,000, and R represents identical bivalent organic radicals or any combination of bivalent organic radicals selected from the group consisting of —(CX$_2$)$_p$—, wherein p ranges from 2 to 8 when X is fluorine and 2 to 18 when X is hydrogen, chlorine, nitro or aryl; arlene; and an oligomeric or polymeric radical prepared by reacting a dicarboxylic acid halide with a fluorinated epoxide and having the formula:

CFY(OCF$_2$CFY)$_m$O(CS$_2$)p O(CFYCF$_2$O)$_n$ CFY wherein Y is fluorine or trifluoromethyl, X is nitro, aryl, hydrogen, chlorine or fluorine, p ranges from 1 to 18 and m+n ranges from 2 to 7, which comprises: thermally condensing a diamidoxime monomer of the formula:

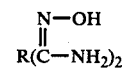

wherein R is as defined above.

2. The process of claim 1, wherein the heating is carried out at temperature within the range of about 100 to about 250° C. for a period of 2 hours to 96 hours.

3. The process of claim 1, wherein said condensation reaction is conducted in the substantial absence of oxygen.

4. The process of claim 1, wherein said bivalent organic radical contains at least one bivalent perfluorinated polyalkyl ether radical.

5. The process of claim 4, wherein said perfluorinated polyalkyl ether radical is one or two moieties of the formula:

—CFY(OCF$_2$CFY)$_m$O(CX$_2$)$_p$O(CFYCF$_2$O)$_n$-CFY— in which Y is a fluorine atom or a trifluoromethyl group; X represents fluorine, chlorine or hydrogen, aryl or nitro; p is an integer from 1 to 8; and m + n ranges from 2 to 7.

6. A perfluorinated polyalkyl ether compound of the formula R[C(NH$_2$)=NOH]$_2$ wherein R is a bivalent radical consisting of one or two units of the formula:

—CFY(OCF$_2$CFY)$_m$O(CX$_2$)$_p$O(CFYCF$_2$O)$_n$CFY
— in which Y is a fluorine atom or a trifluoromethyl group; X represents an atom of fluorine, chlorine or hydrogen, aryl or nitro; p is an integer from 1 to 8; and the sum of m + n ranges from 2 to 7.

7. A heat and oxygen resistant polymeric material containing 1,2,4-oxadiazole linking groups and having the formula:

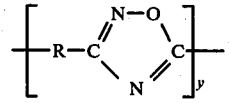

wherein y is an integer of at least 2 and is commensurate with a molecular weight range of about 3000 to about 50,000 and R is a bivalent fluorinated aliphatic radical as defined in claim 5.

* * * * *